Nov. 27, 1923.　　　　　　　　　　　　　　　　　1,475,532
W. E. BARNHART ET AL
CONCRETE BLOCK MOLDING MACHINE
Filed July 26, 1922　　　　4 Sheets-Sheet 1
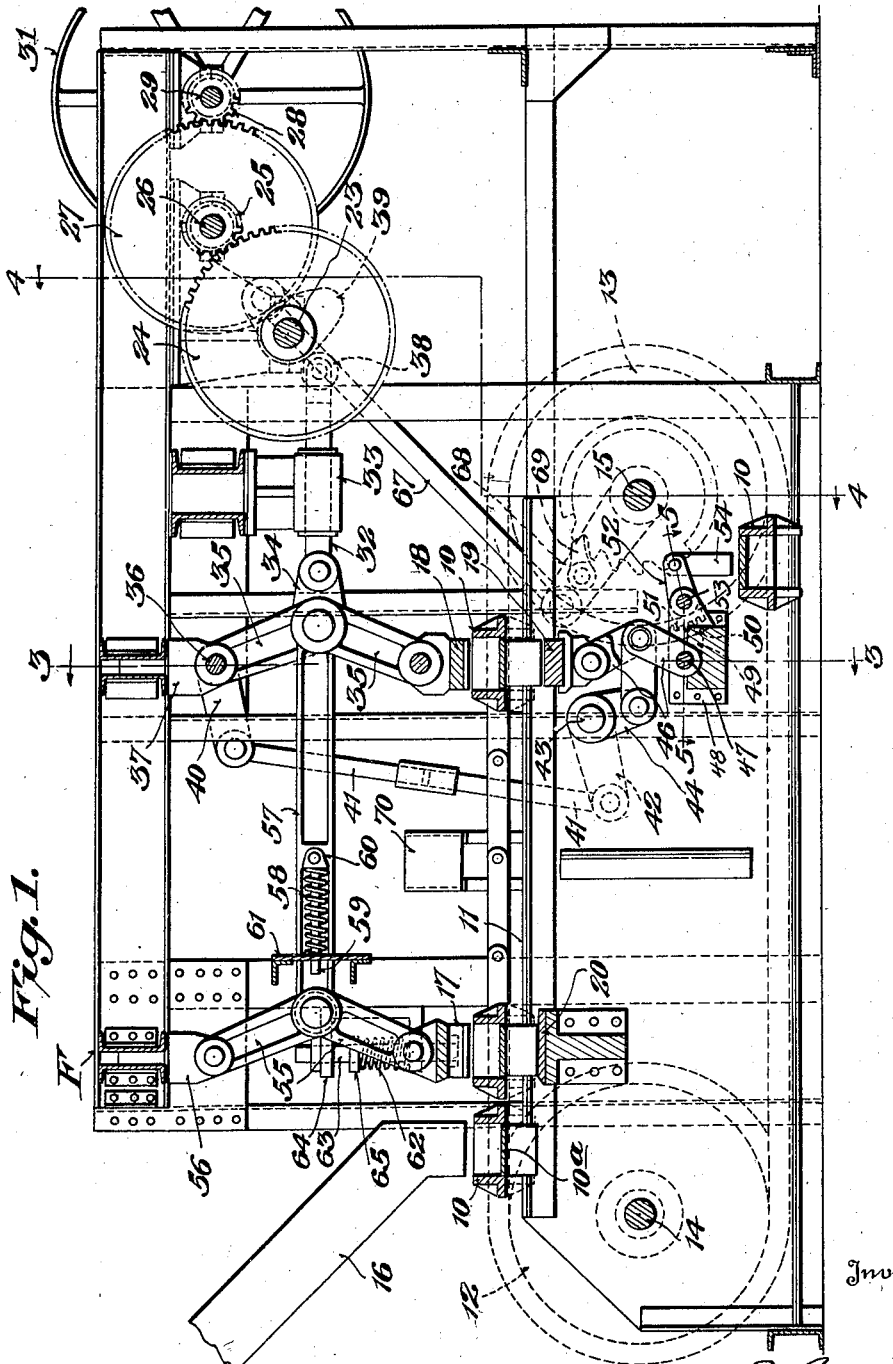
Inventors
William E. Barnhart
Michael E. Lohr
By Church & Church their Attorneys Nov. 27, 1923. 1,475,532
W. E. BARNHART ET AL
CONCRETE BLOCK MOLDING MACHINE
Filed July 26, 1922 4 Sheets-Sheet 2
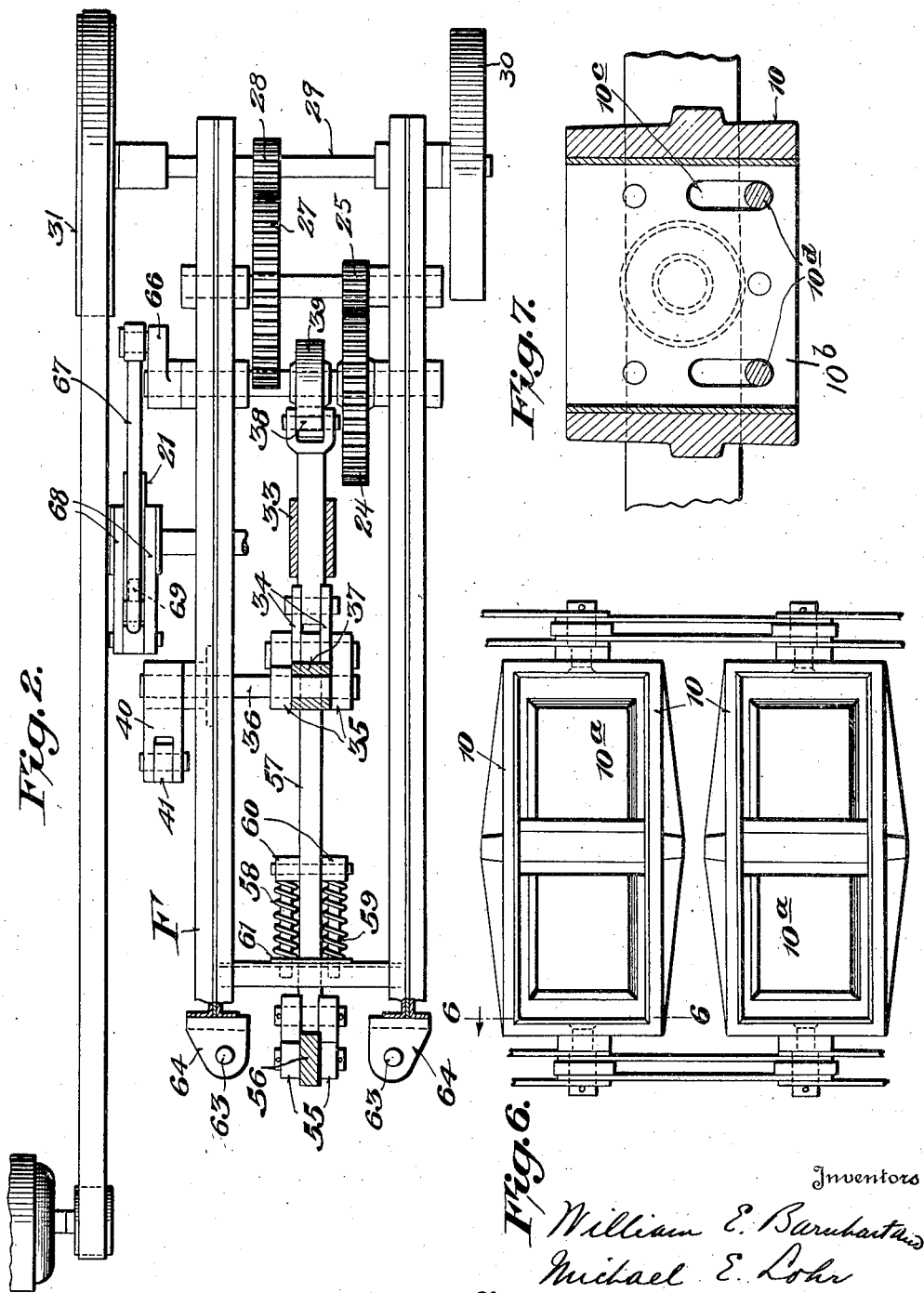

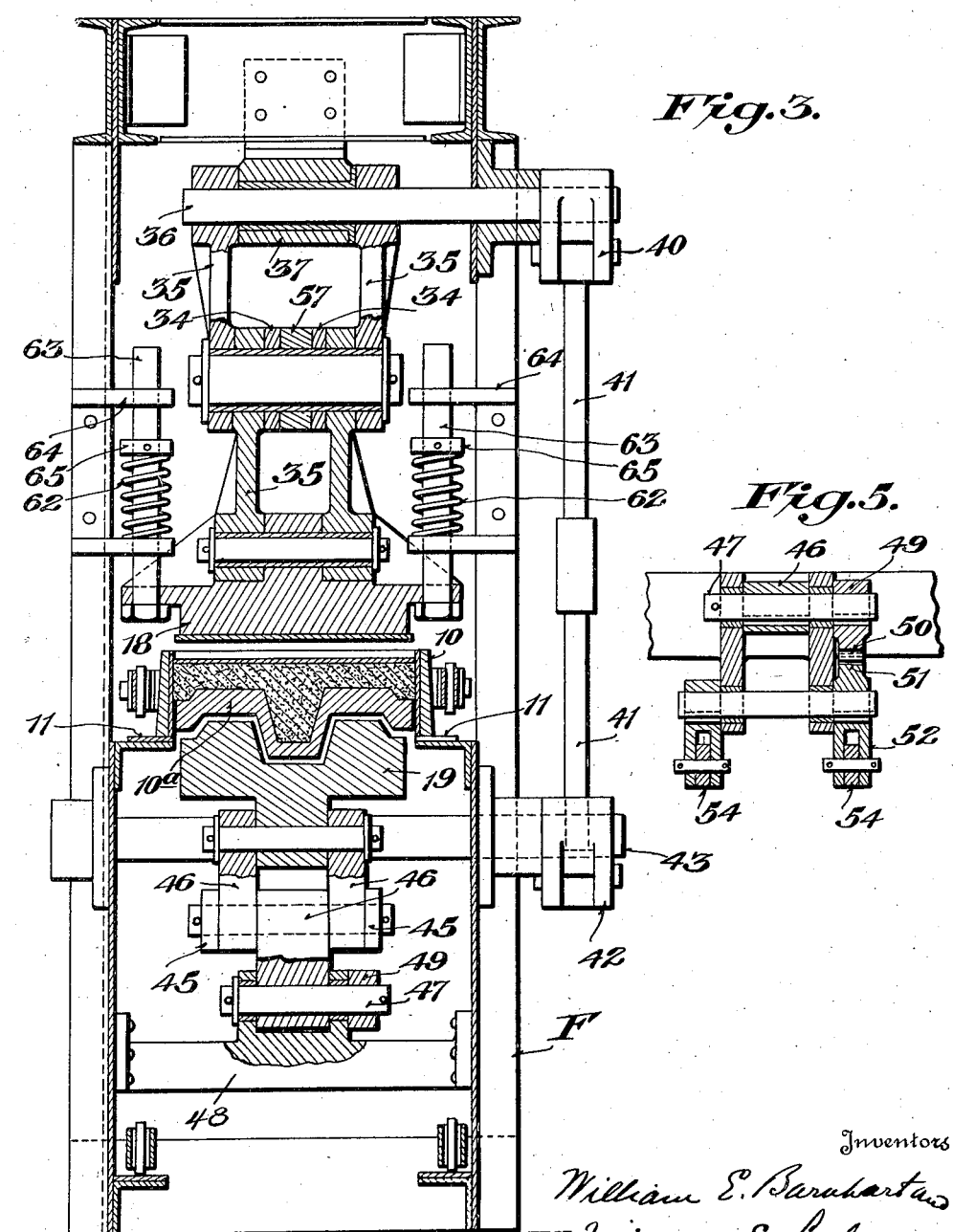

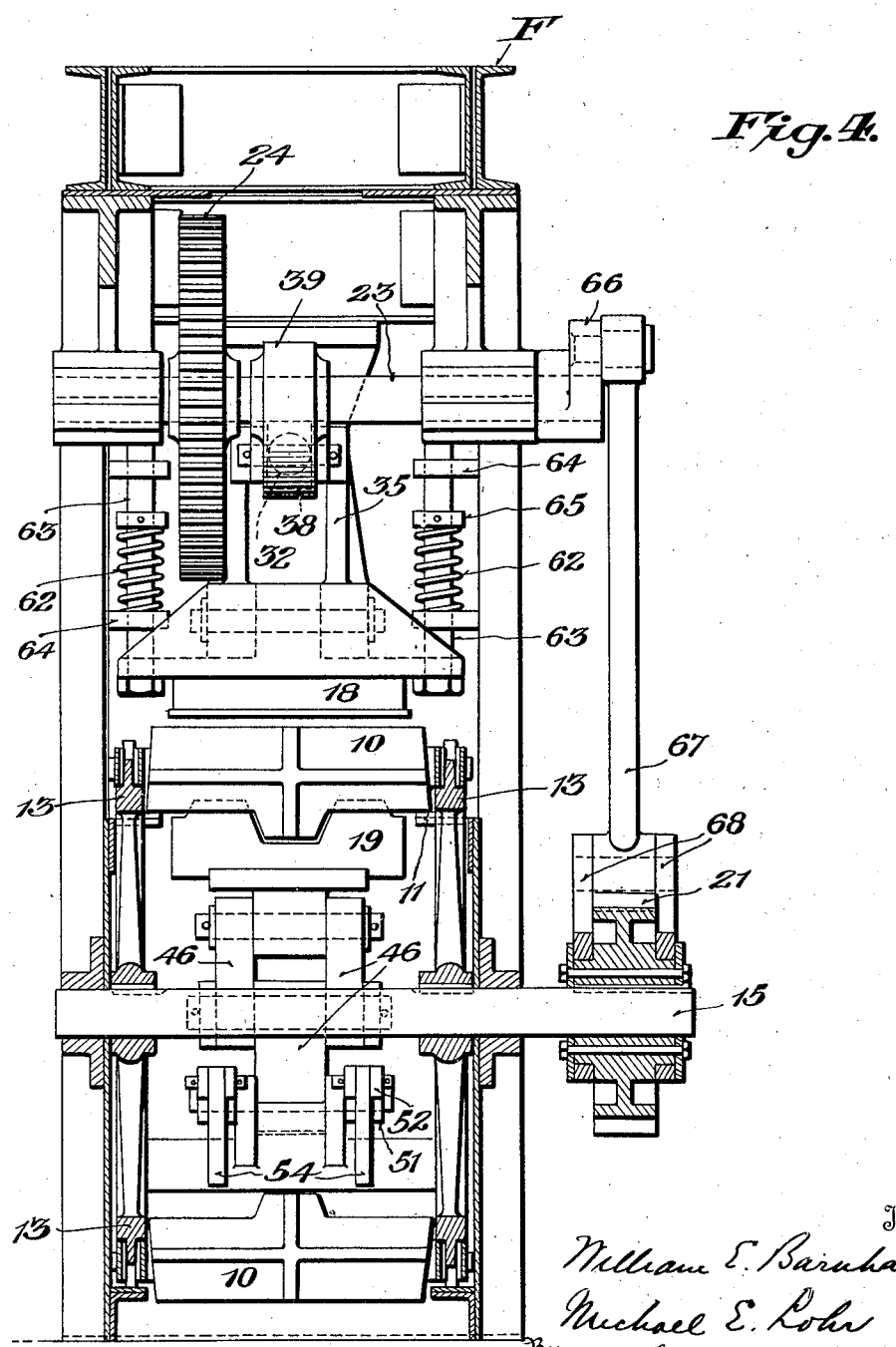

Patented Nov. 27, 1923.

1,475,532

UNITED STATES PATENT OFFICE.

WILLIAM E. BARNHART AND MICHAEL EARL LOHR, OF JOHNSTOWN, PENNSYLVANIA.

CONCRETE-BLOCK-MOLDING MACHINE.

Application filed July 26, 1922. Serial No. 577,523.

*To all whom it may concern:*

Be it known that we, WILLIAM E. BARNHART and MICHAEL EARL LOHR, citizens of the United States, residing at Johnstown, in the county of Cambria and State of Pennsylvania, have invented certain new and useful Improvements in Concrete-Block-Molding Machines; and we do hereby declare the following to be a full, clear, and exact description of the same, reference being had to the accompanying drawings, forming part of this specification.

This invention relates to molding machines and particularly to machines for molding concrete blocks although it will be apparent that the invention is equally applicable to machines adapted to mold analogous plastic substances.

An object of the present invention is to simplify the construction and operation of machines of this character, thus reducing the cost of production as well as that of maintenance.

With this and other objects in view the invention consists in certain details of construction and arrangements and combinations of parts all as will be hereinafter more fully described and the novel features thereof particularly pointed out in the appended claims.

In the accompanying drawings—

Figure 1 is a side elevation of a machine embodying the present improvements;

Fig. 2 is a top plan view of the machine, certain parts being omitted to avoid confusion;

Fig. 3 is a sectional view on line 3—3 of Fig. 1;

Fig. 4 is a sectional view on the line 4—4 of Fig. 1;

Fig. 5 is a detail view of a portion of the operating connections for intermittently advancing the molds on the line 5—5 of Fig. 1, and Figs. 6 and 7 are detail views illustrating the construction and arrangement of the molds, Fig. 7 being taken on the line 6—6 of Fig. 6.

Practically the entire mechanism is supported in a frame F and as is usually the practice in machines of this type, the molds 10, of which there may be as many as desired, are arranged in the form of an endless chain, the several molds being pivotally connected together and carried on longitudinal wearing plates 11 on frame F and two sprockets 12, 13 mounted at longitudinally spaced points on shafts 14, 15 journaled transversely of said frame. Located above sprocket 12, which is at the so-called receiving end of the machine, is a suitable means for successively charging the molds with a predetermined quantity of the concrete or other material. The material is, of course, delivered to the upper reach of molds but as this delivering mechanism forms no part of the present invention the chute shown diagrammatically at 16 will suffice for illustrating this portion of the machine.

The molds are adapted to be intermittently advanced from sprocket 12 towards sprocket 13 at the delivery end of the machine by a pawl actuated ratchet wheel 21 on shaft 15 of said sprocket 13 and after the material is placed in the molds 10 it is first pressed into said molds by a vertically movable plunger 17 located above the upper reach of molds. Each mold is then advanced to a position between two vertically movable plungers 18, 19 located, respectively, above and below the upper reach of molds. Said plungers 18, 19 are adapted to be moved towards each other to compress the material in the mold sufficiently and give it such solidity as to permit its being subsequently handled in its green state. Each mold is then carried around sprocket 13 to a point where it will assume an inverted position in the lower reach of molds where upon the material is ejected from the mold by suitable mechanism later described herein.

To facilitate the pressing of the material in the molds each of the latter is provided with a freely slidable bottom 10ª which, when the material is being preliminarily compressed by plunger 17, is supported on and held stationary by a transverse supporting casting 20 mounted in frame F but when the material is to be finally compressed between the upper and lower plungers 18, 19 the lower plunger 19 engages the movable mold bottom and pushes it upward toward the descending plunger 18. By using the two plungers, movable toward each other considerable pressure can be placed on the material with comparatively slight movement of the plungers. The movable mold bottoms also facilitate the discharge of the molded material from the molds as will later appear. To permit this sliding movement of the mold bottom 10ª, said bottoms are preferably provided at each end with an upward extension 10ᵇ having therein a pair of slots 10ᶜ through which inwardly projecting pins 10ᵈ on the sides of the molds extend. The bottom of the mold is thus loosely suspended in the mold and besides being capable of being positively moved for compressing and ejecting the material, it is also free to drop back to its original position as the mold moves from the lower reach of molds around the sprocket 12 to the upper reach for receiving the next charge of material.

In accordance with the contemplated objects of the invention, the pawl and ratchet mechanism for moving the molds, the ejecting mechanism, and the preliminary and final pressing plungers are all operated through suitable intermediate connections from one main driving shaft 23 journaled in the sides of frame F. Power is transmitted to said shaft 23 from any suitable source by reduction gearing consisting of a gear 24 on said shaft meshing with a pinion 25 on a transverse shaft 26 in frame F which shaft also carries a relatively large gear 27 meshing with another pinion 28 on a shaft 29 journaled in frame F. The ends of shaft 29 extend beyond the sides of the frame and a fly wheel 30 is mounted on one of said ends and a pulley 31 is provided at the opposite end for the application of power to said shaft.

A convenient form of connections for operating plunger 18 consists of a rod 32 slidably mounted in a bearing 33 at the top of frame F and connected at one of its ends by a link 34 to a pair of vertically disposed toggle links 35, the lower one of which carries said plunger. The upper link is mounted, at its upper end, on a transverse shaft 36 which is journaled in a bearing 37 fixedly secured in the upper members of frame F whereby the upper toggle link is prevented from moving upward but will, on the other hand rock said shaft 36. The opposite end of rod 32 has a cam roller 38 thereon adapted to cooperate with a cam 39 on main drive shaft 23 and as will be apparent, a movement of the rod toward the receiving end of the machine will result in plunger 18 being depressed.

To simultaneously elevate the lower plunger 19, an arm 40 is mounted on the shaft 36 and is connected by an adjustable connecting rod 41 to another similar arm 42 mounted on a transverse shaft 43 journaled in the lower portion of frame F. A second arm 44 is also mounted on shaft 43 below the center of the molds 10 and is connected by a link 45 to a pair of toggle links 46, the upper one of which carries the pressing plunger 19. The upper link of toggles 35, shaft 36 and arm 40 are, in effect, bell crank levers as are also the lower arm 42, shaft 43 and arm 44 and when plunger 18 is depressed the upper link of said toggles 35 will rock shaft 36 with the result that connecting rod 41 will rock shaft 43 and, through link 45, and toggles 46 elevate plunger 19.

The preferred form of operating connections for the ejecting mechanism is as follows: The lower link of toggles 46 is mounted on a shaft 47 journaled in a fixed supporting casting 48 and said shaft is rocked by the toggles when the latter are actuated. This rocking motion of shaft 47 is utilized for effecting the discharge of the molded blocks from molds 10 by mounting an arm 49 on said shaft and providing said arm at its free end with a segment 50 which is adapted to mesh with a segment 51 on one end of a lever 52 fulcrumed intermediate its ends on a shaft 53. The opposite end of said lever 52 is connected to, and is adapted to elevate and depress a plunger 54 which is located at a point above the lower reach of molds where it will engage and depress the movable bottoms 10ª of said molds when the latter are at rest. This depression of plunger 54 and of the mold bottom, while the mold is inverted, will result in the ejectment of the molded material. Any suitable means for handling the molded material upon its discharge from the molds, such as the traveling belt disclosed in Patent No. 482,252, dated September 6, 1892, may be provided beneath the point where the blocks are ejected.

The preliminary pressing plunger 17 is also operated by a pair of toggle links 55, the lower one of which carries the plunger head and the upper one of which is connected to a bearing 56 rigidly secured in the top of the frame. Said toggles are operated from shaft 23 preferably by a connecting rod 57 interposed between said toggles and toggles 35 whereby the two sets of toggles and plungers are simultaneously operated. As the toggles are cam operated, means are necessary for retracting them and these retracting means preferably consist of a coiled spring 58 surrounding a pin 59 on connecting rod 57 adapted to be compressed between the head 60 of said pin and any suitable fixed member 61 on the frame when the plungers are moved toward the molds. Additional springs 62 are also provided on rods 63 carried by the plunger heads. Said rods slide in slots in brackets 64 on frame F and the springs 62 are compressed between the brackets and collars 65 on the rods when the plungers are moved towards the molds. As the cam 34 is carried around to its ineffective position both sets of springs, which are then compressed, act to return the toggles and plungers to their retracted positions.

A simple arrangement of operating connections for effecting the intermittent advance of the series of molds 10 comprises a crank 66 on shaft 23 connected by a rod 67 to an arm 68 loosely mounted on shaft 15 of sprocket 13. Pivotally mounted on said arm 68 is the pawl 69 which engages the ratchet 21 on said shaft and rotation of shaft 23 will periodically elevate crank 66 and arm 68 with the result that ratchet 21 and sprocket wheel 13 will be intermittently rotated one step. Between these periods of movement the pawl will be returned to engage the next tooth of the ratchet and it is during these periods of rest that the filling, pressing and ejecting operations are effected.

All of the various parts for compressing the material in the molds and for ejecting the material from the molds being simultaneously operated from the single shaft 23 and the mechanism for intermittently advancing the molds being operable by the same element, the periods of rest and operation of the different parts may be readily regulated relatively to one another simply through the proper relative positioning of two elements, namely, the crank 66 and the cam 39 on said shaft 23. This emphasizes the simplicity of the machine as produced in accordance with the present invention.

For convenience, a receptacle shown diagrammatically at 70, for surfacing material may be placed intermediate plungers 17 and 18, above the molds and as each mold passes this point the surfacing material can be applied to the material in the molds, after which, if desired, a thin steel plate may be placed on top of the material preparatory to its being finally compressed. This plate may then serve as a support for the finished block while it is being removed from the mold boxes.

What is claimed is:—

1. In a machine of the class described, the combination of a series of pivotally connected molds, a drive shaft, means above the molds for preliminarily pressing the material in said molds, means located above and below the molds for finally compressing the material, operating connections intermediate said shaft and both of said pressing means for simultaneously operating the latter, means for intermittently moving the series of molds, and ejecting mechanism for removing the molded material from said molds.

2. In a machine of the class described, the combination of a series of pivotally connected molds, a drive shaft, means for preliminarily pressing the material in the molds, means located above and below the molds for finally compressing the material in the molds, operating connections between said shaft and both of said pressing means, means operatively connected to said shaft for intermittently moving the series of molds, and ejecting mechanism for removing the molded material from the molds.

3. In a machine of the class described, the combination of a series of molds, a drive shaft, means for preliminarily pressing the material in the molds, means located above and below the molds for finally compressing material in the molds, operating connections intermediate said shaft and both sets of pressing means, means for intermittently advancing the series of molds, and ejecting mechanism operatively connected to said drive shaft for removing the molded material from the molds.

4. In a machine of the class described, the combination of a series of pivotally connected molds each having a slidable bottom, a drive shaft means for preliminarily pressing the material in the molds, means located above and below the molds for finally compressing the material in the molds, operating connections intermediate said shaft and both of said pressing means, means for intermittently advancing the series of molds and ejecting means for removing the molded material from the molds, said ejecting mechanism comprising a pair of cooperating segments operably connected to the final compressing means and a plunger connected to one of said segments and adapted to engage the slidable mold bottoms.

5. In a machine of the class described, the combination of a rotatable shaft, a series of pivotally connected molds, a plunger connected above the molds for preliminarily pressing the material in the molds, means comprising plungers located above and below the molds for finally compressing said material in the molds, connections between the two sets of plungers for effecting simultaneous operation thereof, connections between the upper and lower plungers of the final pressing means, and operating connections between the upper plunger of the final pressing means and said drive shaft.

6. In a machine of the class described, the combination of a drive shaft, a series of molds each provided with a slidable bottom, a downwardly movable plunger above the molds, an upwardly movable plunger below the molds and adapted to engage and elevate the mold bottoms, and means for effecting simultaneous operation of said plungers, said means comprising connections between the two plungers and between one of said plungers and said drive shaft.

7. In a machine of the class described, the combination of a series of intermittently movable molds having movable bottoms, a downwardly movable plunger above the molds, an upwardly movable plunger below the molds adapted to engage and elevate the mold bottoms, toggles connected to the upper plunger for depressing said plunger, toggles connected to the lower plunger for elevating said plunger, connections between said toggles, a drive shaft, and connections between said shaft and one of said toggles.

8. In a machine of the class described, the combination of a series of intermittently movable molds having slidable bottoms, a downwardly movable plunger above the molds, an upwardly movable plunger below the molds adapted to engage and elevate the mold bottoms, toggles connected to the upper plunger, toggles connected to the lower plunger, connections between said toggles, a drive shaft, connections between said shaft and one of the toggles, a second upper plunger, toggles connected to the second upper plunger, and connections between the two upper plunger toggles.

9. In a machine of the class described, the combination of a pair of rotatable sprocket wheels, an endless series of pivotally connected molds on said sprockets, each of said molds having a slidable bottom, a downwardly movable plunger above the molds, an upwardly movable plunger below the molds adapted to engage and elevate the mold bottoms, toggles connected to the upper plunger, toggles connected to the lower plunger, connections between said toggles, a drive shaft, connections between said shaft and one of said toggles, a second upper plunger, toggles connected to the second upper plunger, connections between the two upper plungers, a pawl and ratchet mechanism for actuating one of said sprockets, and operating connections between said drive shaft and said pawl and ratchet mechanism.

WILLIAM E. BARNHART.
MICHAEL EARL LOHR.